US011151849B2

(12) United States Patent
Haber

(10) Patent No.: US 11,151,849 B2
(45) Date of Patent: Oct. 19, 2021

(54) CARGO DOOR SEAL PROTECTOR WITH GPS TRACKER

(71) Applicant: Greg Haber, Moonachie, NJ (US)

(72) Inventor: Greg Haber, Moonachie, NJ (US)

(*) Notice: Subject to any disclaimer, the term of this patent is extended or adjusted under 35 U.S.C. 154(b) by 322 days.

(21) Appl. No.: 16/292,010

(22) Filed: Mar. 4, 2019

(65) Prior Publication Data
US 2020/0141177 A1 May 7, 2020

Related U.S. Application Data

(60) Provisional application No. 62/755,088, filed on Nov. 2, 2018.

(51) Int. Cl.
G08B 13/08 (2006.01)
E05G 1/10 (2006.01)
B60R 25/10 (2013.01)
B60R 25/33 (2013.01)
B60R 25/102 (2013.01)
E05G 1/00 (2006.01)
G01S 19/16 (2010.01)

(52) U.S. Cl.
CPC .......... G08B 13/08 (2013.01); B60R 25/1004 (2013.01); B60R 25/33 (2013.01); E05G 1/10 (2013.01); B60R 25/102 (2013.01); E05G 1/005 (2013.01); G01S 19/16 (2013.01)

(58) Field of Classification Search
CPC ..... B60R 25/00; B60R 25/10; B60R 25/1004; B65R 25/1007; B65R 25/102; B65R 25/33; E05B 1/00; E05B 1/003; E05B 3/00; E05B 47/06; E05B 67/38; G08B 13/00; G08B 13/02; G08B 13/06; G08B 13/08; B65D 90/00; B65D 90/008; B65D 90/22; B65D 90/48; B65D 55/028
See application file for complete search history.

(56) References Cited

U.S. PATENT DOCUMENTS

2004/0183673 A1* 9/2004 Nageli ................... G01S 5/0018
340/539.13
2005/0144991 A1* 7/2005 Bravo ................... E05B 13/002
70/56
2006/0192673 A1* 8/2006 Irwin ..................... G06Q 10/08
340/539.13
2011/0018707 A1* 1/2011 Dobson ............... B65D 55/028
340/539.13
2018/0283048 A1* 10/2018 Hage ........................ G01D 5/16
2018/0350209 A1* 12/2018 Song ....................... G08B 25/10

* cited by examiner

Primary Examiner — Van T Trieu
(74) Attorney, Agent, or Firm — Epstein Drangel LLP; Robert L. Epstein

(57) ABSTRACT

The protector includes a box-like metal enclosure formed of first and second parts connected for movement between an open position, wherein a seal associated with the vehicle cargo compartment door handle is accessible, and a closed position, in which the seal is surrounded and cannot be accessed. A light-actuated GPS tracking device associated with the enclosure transmits an alarm signal to a remote server when light is detected due to opening of the enclosure parts. The alarm signal includes information as to the time and location of the vehicle when the enclosure was opened.

11 Claims, 4 Drawing Sheets

CARGO DOOR SEAL PROTECTOR WITH GPS TRACKER

CROSS-REFERENCE TO RELATED APPLICATIONS

Priority is claimed on Provisional Patent Application No. 62/755,088, filed Nov. 2, 2018, the contents of which are incorporated herein by reference.

STATEMENT REGARDING FEDERALLY SPONSORED RESEARCH OR DEVELOPMENT

Not Applicable

REFERENCE TO A "SEQUENCE LISTING", A TABLE, OR A COMPUTER PROGRAM LISTING APPENDIX SUBMITTED ON COMPACT DISC

Not Applicable

BACKGROUND OF THE INVENTION

1. Field of the Invention

The present invention relates to a security device for protecting cargo in the cargo compartment of a vehicle during transport and more particularly to a portable enclosure designed to be mounted on the exterior of the vehicle to physically protect the seal on the door which contains a light actuated GPS Tracker module, the module being capable of automatically sending a wireless alarm signal to a remote server in response to detecting light within the enclosure indicating that the enclosure has been opened, the signal including information as to the location of the vehicle and the time that the enclosure was opened.

2. Description of Prior Art Including Information Disclosed Under 37 CFR 1.97 and 1.98

Vehicles of various types, such as trucks, trailers, aircraft, rail cars, ships and the like commonly transport cargo from one destination to another. The vehicles are provided with enclosed cargo compartments within which the cargo is situated. The cargo compartment is accessed through a door which can be locked to prevent unauthorized access to the cargo compartment, preventing the cargo from being damaged or stolen.

The cargo compartment doors can be of the side mounted swing-out type or the roll-up type. Both types of doors are provided with factory installed handles which can be moved between a position in which the cargo compartment door can be opened and a position in which the cargo compartment door cannot be opened. A lock is associated with the handle. The lock prevents the handle from being moved to the position where the door can be opened, thereby preventing unauthorized access to the cargo compartment.

In order to determine if the cargo compartment has been accessed without authorization during transit, a seal may installed on the handle of the cargo compartment door after the cargo is loaded, the door is closed and the handle is moved to the position where the door cannot be opened. Once the seal is installed, the handle cannot be moved and thus the door cannot be opened, without breaking the seal.

Some seals used for this purpose are made of plastic and can be easily broken. Other seals such as bolt seals are made of metal typically require tools to break. Regardless of the type, the seals are not intended to protect the cargo by preventing access to the cargo compartment. The function of the seals is to act as a visible indicator of whether the cargo door has been opened during transit.

If the vehicle arrives at its destination with the seal intact, that indicates that the cargo compartment has not been accessed and the cargo can be accepted. On the other hand, if the vehicle arrives with the seal broken, that indicates that the handle may have been moved, and that the cargo may have been tampered with or stolen, alerting the recipient of the cargo to reject the cargo, or at least to carefully examine the contents of the cargo compartment before accepting the shipment.

Accordingly, the condition of the seal when the vehicle reaches its destination is important. It is important to the shipper, to those responsible for the vehicle (and cargo) during transit, and to the receiver of the cargo, that the seal accurately reflect whether the cargo compartment has been accessed during transit or not.

Often the driver of the vehicle or the delivery company is merely transporting the vehicle with the cargo and does not own the vehicle or the cargo. However, the driver and/or delivery company may be financially responsible for the cargo if the seal is broken and the load is refused at the delivery point.

In U.S. Pat. No. 9,562,374, a device for protecting the seal on a cargo compartment door against accidental breakage during transit is disclosed. The patented seal protector includes a box-like metal enclosure or housing which surrounds the seal and a portion of the door handle. The protector enclosure is formed of housing parts connected by a spring-loaded hinge which allows for the housing parts to be moved between an open position, in which the seal (and handle part) are exposed, and a closed position, in which the contents of the enclosure including the seal cannot be accessed.

At least one of the housing parts is hollow and configured to accommodate the handle portion such that when the housing parts are in the closed position, the seal and handle part are fully enclosed. A padlock may be used to lock the housing parts in the closed position such that the seal cannot be accidentally broken, thereby falsely indicating that the cargo compartment door has been opened during transit.

Unauthorized opening of the seal protector enclosure would normally occur in transit and thus might not be not be detected until the vehicle reaches its destination, or at least until the driver inspects the cargo department door. Thus, there may be considerable time (hours or days) after the seal protector has been compromised that the driver or cargo recipient becomes aware that the cargo compartment may have been opened. That would be way too late to alert the authorities for action against the thief or to save the cargo.

In situations where the vehicle driver and/or the cargo recipient are not the vehicle owner, which is often the case, there is no guarantee that the individual receiving the cargo will alert the authorities or vehicle owner in a timely fashion that the cargo compartment may have been accessed without authorization during transit.

Accordingly, there is a need for a security device which can physically protect the seal on a vehicle cargo compartment door during transit and automatically send a wireless alert signal including information about the location of the vehicle and time when the seal protector enclosure was opened.

The security device of the present invention could be fabricated for a particular vehicle, or for a particular type of vehicle. However, for maximum versatility, the device should be portable such that it can be used a variety of different vehicles, as needed. That allows a company that ships cargo using vehicles which it does not own to remotely monitor the state of the seal protector enclosures on the vehicles carrying the company's cargo. In the event the seal protector enclosure on one of the cargo carrying vehicles is opened during transit, the cargo owner could immediately alert the police that the vehicle may be under attack and provide the exact location of the vehicle being attacked.

It is therefore important that the device be designed to be easily installed on and removed from a vehicle and that it be capable of use with a wide variety of different cargo compartment doors, door handles and seal configurations such that a single device can be used on many different vehicles.

BRIEF SUMMARY OF THE INVENTION

The purpose of the security device of the present is to physically enclose the seal on the cargo compartment door of a vehicle and at the same time to provide notification that the protector enclosure has been opened indicating that the seal has been exposed and that the cargo compartment door may be opened allowing unauthorized access to the cargo compartment.

Notification is made by a GPS tracking module located within or associated with the seal protector enclosure. When actuated, the GPS tracking module causes a mobile transmitting device, such as a smartphone, to wirelessly transmit an alarm signal to a remote server.

The alarm signal includes information as to the location of the vehicle provided by the GPS tracker module and the time when the seal protected enclosure was opened. Upon receipt of the alarm signal, the cargo owner can immediately alert the proper police authorities that its vehicle is being attached and provide the exact location of the vehicle.

Conventional GPS trackers modules include or may be connected to a light sensor. When the present invention is installed on a vehicle, and the enclosure parts are closed around the seal and a portion of the door handle, the inside of the enclosure is dark. The opening of the enclosure allows light to enter the enclosure. That light is detected by the light sensor. The light sensor actuates the GPS tracking module to cause the smartphone to transmit the alarm signal containing the location and time information.

The enclosure of patented seal protector noted above may be modified to include a mount (or insert) for the GPS tracker module. Once the modified seal protector enclosure is installed on the vehicle and closed, the GPS light sensor associated with the GPS tracker module will not sense any light. However, if the seal protector enclosure is opened, light will enter the enclosure and will be detected by the light sensor which will actuate the GPS tracker module to cause the smartphone to transmit the alarm signal. The alarm signal will be received at a remote server and the recipient can immediately alert the authorities as to the location of the vehicle and the time that the enclosure opening was detected.

Although there are several different types of commercially available GPS tracking modules, the data pusher type is the most common type used for asset tracking, personal tracking and vehicle tracking. Also known as a GPS beacon, this kind of device pushes (i.e. "sends") the position of the device as well as other information like speed or altitude at regular intervals, to a determined server, that can store and instantly analyze the data.

The GPS tracker module and mobile transmitting device of the present invention can be packaged side-by-side in the same box, and may be be powered by the same battery. For certain applications, the mobile device can be programmed to send a text message at regular intervals containing location data from the GPS receiver. Newer GPS-integrated smartphones running GPS tracking software can turn the phone into a data pusher (or The GPS tracker module employed in the present invention may be modified for permanent or removable mounting within or outside of the seal protector enclosure and is programed to be actuated by the light sensor to cause the mobile device to transmit the location and time data.

In general, the above objects are achieved by the present invention which relates to a security device for protecting cargo in the cargo compartment of a vehicle having a cargo compartment access door associated with a seal. The device includes a protector for the seal in the form of an enclosure which surrounds and isolates the seal. The enclosure is configured to be opened to access the seal. The device further includes a light-actuated GPS tracking module and a mobile transmitting device, such as a smartphone. The GPS tracking module and the mobile device are operatively connected and associated with the enclosure. The GPS tracking module is actuated by light entering the enclosure when the enclosure is opened to cause the mobile device to transmit a wireless alarm signal to a remote server. The alarm signal indicates the location of the vehicle and time when the enclosure was opened.

The cargo compartment door has a handle moveable between a first position, wherein the cargo compartment door can be opened to access the cargo compartment, and a second position, wherein the cargo door cannot be opened. The seal must be broken for the handle to be moved from its second position. The enclosure surrounds a portion of the handle when it is closed.

The enclosure may take the form of a hollow metal box made up of first and second parts movable between an open position, wherein the seal and a portion of the handle are exposed, and a closed position, wherein the seal and handle portion cannot be accessed.

At least one of the enclosure parts is configured to accommodate the portion of the handle when the parts are in the closed position.

Means are provided for locking the enclosure parts in the closed position. The locking means may take the form of a padlock.

The enclosure includes a base part and a cover part. The base part is situated adjacent the surface of the door, under a portion of the handle.

The cargo compartment access door has hardware for mounting the seal. The base part has a recess adapted to accommodate the seal mounting hardware of the door.

Means are provided for permanently or removeably attaching the GPS tracking module and the mobile transmitting device to the interior surface of the enclosure.

BRIEF DESCRIPTION OF THE SEVERAL VIEWS OF DRAWINGS

To these and to such other objects that may hereinafter appear, the present invention relates to a cargo seal protector with GPS tracking as described in detail in the following specification and recited in the annexed claims, taken together with the accompanying drawings, in which like numerals refer to like parts and in which:

DETAILED DESCRIPTION OF THE INVENTION

The seal protector includes a strong box-like metal enclosure formed of first and second enclosure parts connected by a spring-loaded hinge. The enclosure parts are moveable between an open position, in which a seal associated with the vehicle cargo compartment access door handle is exposed, and a closed position, in which the seal cannot be accessed. At least one of the housing parts is hollow and configured to accommodate a portion of the door handle such that when the enclosure parts are in the closed position, the seal is fully surrounded. A padlock may be used to lock the enclosure parts in the closed position. When closed, the protector completely isolates the seal from the environment.

There are two different types of cargo compartment access doors which are in common use. Side mounted doors pivot outwards from the sides of the cargo compartment access opening. Roll-up type doors are mounted at the top of the cargo compartment access opening and are moved up to open the door and down to close the door. Because these types of cargo doors move in different ways, different types of locks with handles that move differently are required.

Figure 1:
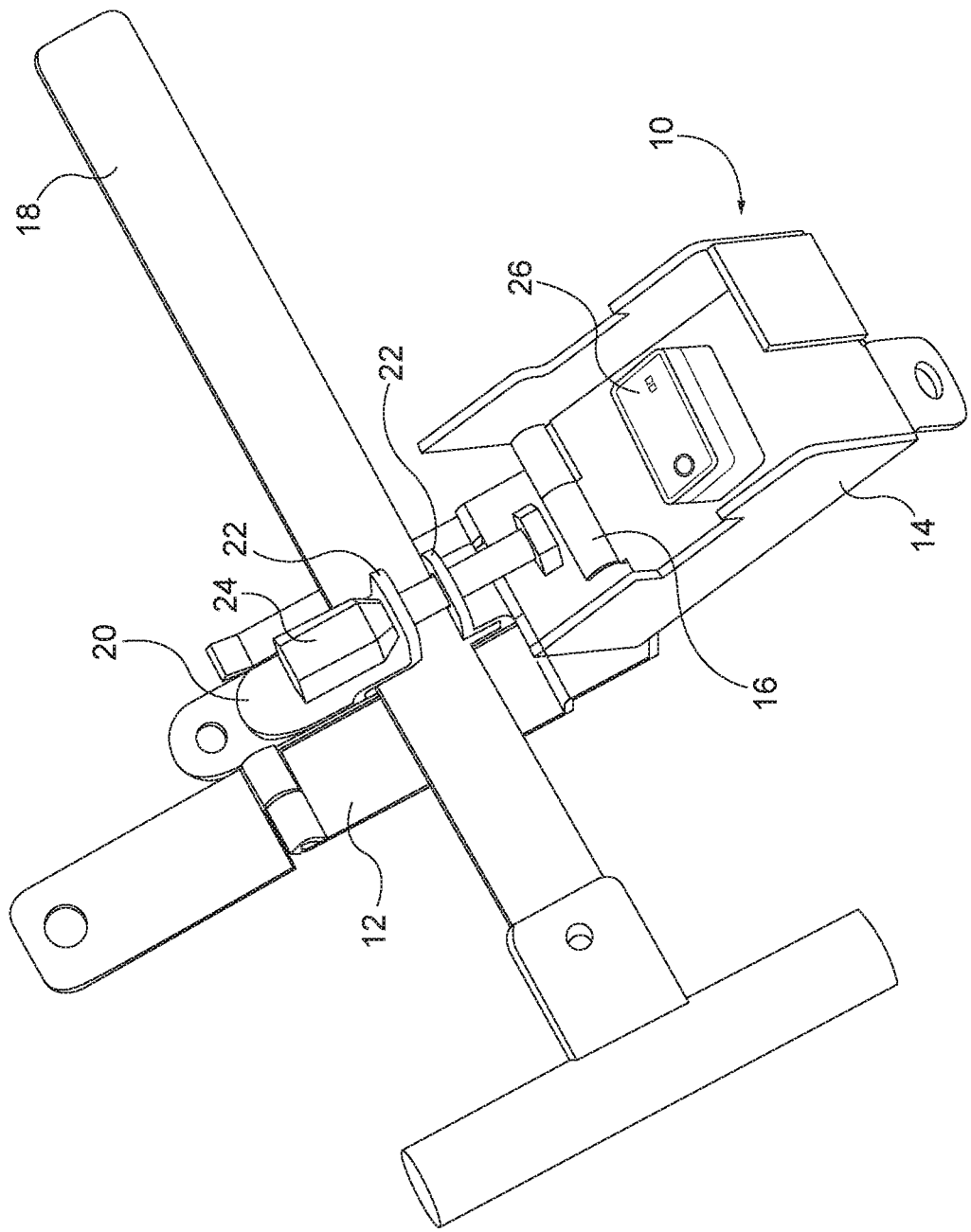
FIG. 1 is a perspective view of a seal protector mounted on the handle of a side mounted cargo compartment access doer with the parts open to show the seal and an internally mounted GPS tracker unit.
Figure 2:
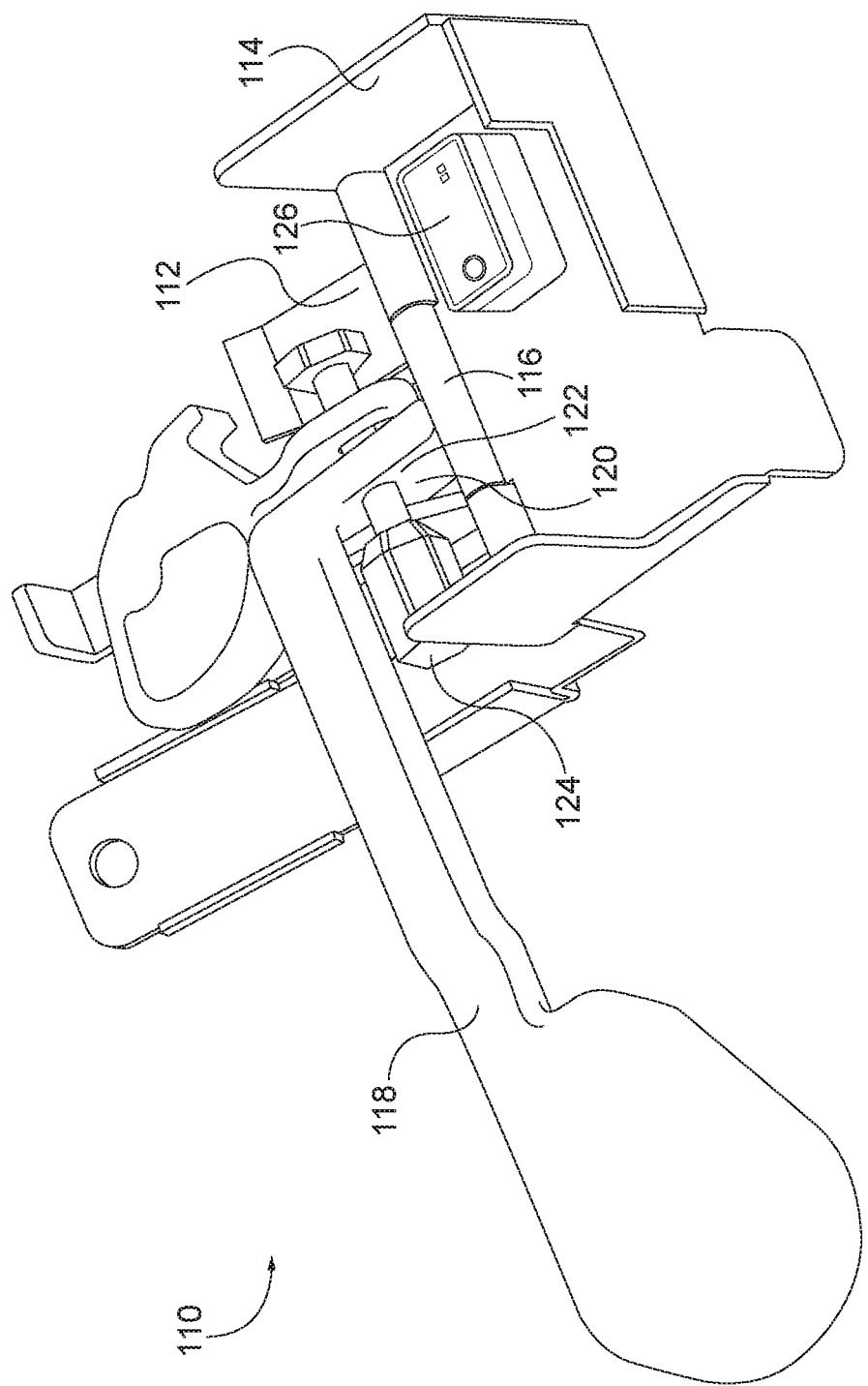
FIG. 2 is a perspective view of a seal detector mounted on the handle of a roll-up cargo compartment access door with the parts open to show the seal and an internally mounted GSP tracker unit.

As a result, seal protectors of a different shape are required for each door type. FIG. 1 shows a seal protector designed for use on a side mounted cargo compartment access door. FIG. 2 shows a seal protector design for use with a roll-up type cargo compartment access door.

In each type, the seal protector is hollow and shaped to accommodate the seal and a portion of the door handle, so the seal protector completely surrounds the seal, and a portion of the door handle, when closed. At the same time, the seal protector is completely portable and can easily moved between cargo compartment access doors on different vehicles.

FIG. 1 shows the seal protector 10. The seal protector includes a base 12 and a hollow cover 14 connected by a spring-loaded hinge 16. The seal protector is designed to be mounted on a portion of the handle 18 of a side mounted cargo compartment assess door. The handle is moveable between a position where the cargo compartment access door can be opened and a position, shown in the figure, where the cargo compartment door cannot be opened.

The door has seal mounting hardware 20 affixed to the exterior surface. Hardware 20 includes spaced, oppositely oriented brackets 22 with aligned openings. The openings are adapted to receive the shaft of a bolt-type metal seal 24. The seal is mounted on the brackets after the door is closed and the handle is in the position of FIG. 1.

Once the seal 24 is in place, the base 12 of the seal protector can slide behind the handle and the seal, as illustrated in FIG. 1. The cover 14 of the seal protector can then be closed to enclose the seal and a portion of the door handle.

Mounted inside of the cover 14 of the seal protector is a GPS tracker unit 26. Although other GPS trackers may be used, one unit that has worked well is the model GL500 Series available from Queclink Wireless Solutions, 3F, 717 Yishan Road, Xuhui District, Shanghai, China, 200233. That unit includes a built-in light sensor and an internal battery power source. The GL500 unit will generate and transmit an alarm signal upon the detection of light. The alarm signal is transmitted to a remote server.

The GPS tracker unit is attached to the interior surface of the seal protector cover by magnets, fasteners, a bracket or other means. Once the GPS tracker unit is set and the seal protector parts are closed, the GPS tracker unit will monitor the light level in the seal protector. If the seal protector cover is opened for any reason, the GPS tracker unit will detect the incoming light and generate and transmit the alarm signal which includes the time and the location of the vehicle when the light was detected.

FIG. 2 shows the seal protector 110. The seal protector includes a base 112 and a hollow cover 114 connected by a spring-loaded hinge 116. The seal protector is designed to be mounted on a portion of the handle 118 of a roll-up type cargo compartment assess door. The handle is rotatable between a position where the cargo compartment access door can be opened and a position, shown in the figure, where the cargo compartment door cannot be opened.

The door has seal mounting hardware 120 affixed to the exterior surface. Hardware 120 includes spaced, oppositely oriented brackets 122 with aligned openings. The openings are adapted to receive the shaft of a bolt-type seal 124. The seal is mounted on the brackets after the door is closed and the handle is in the position of FIG. 2.

Once the seal 124 is in place, the base 112 of the seal protector can slide behind the handle and seal, as illustrated in FIG. 2. The cover 114 of the seal protector can then be closed to enclose the seal and a portion of the door handle.

Mounted to the interior surface of cover 114 is a GPS tracker unit 26, preferably the model GL500 Series available Queclink Wireless Solutions. The GPS tracker unit is attached to the seal protector cover by magnets, fasteners, a bracket or other means. As with the embodiment of FIG. 1, once the GPS tracker unit is set and the seal protector is closed, the GPS tracker unit will monitor the light level in the seal protector. If the seal protector cover is opened for any reason, the GPS tracker unit will generate and transmit the alarm signal with the time and location information.

Figure 3:
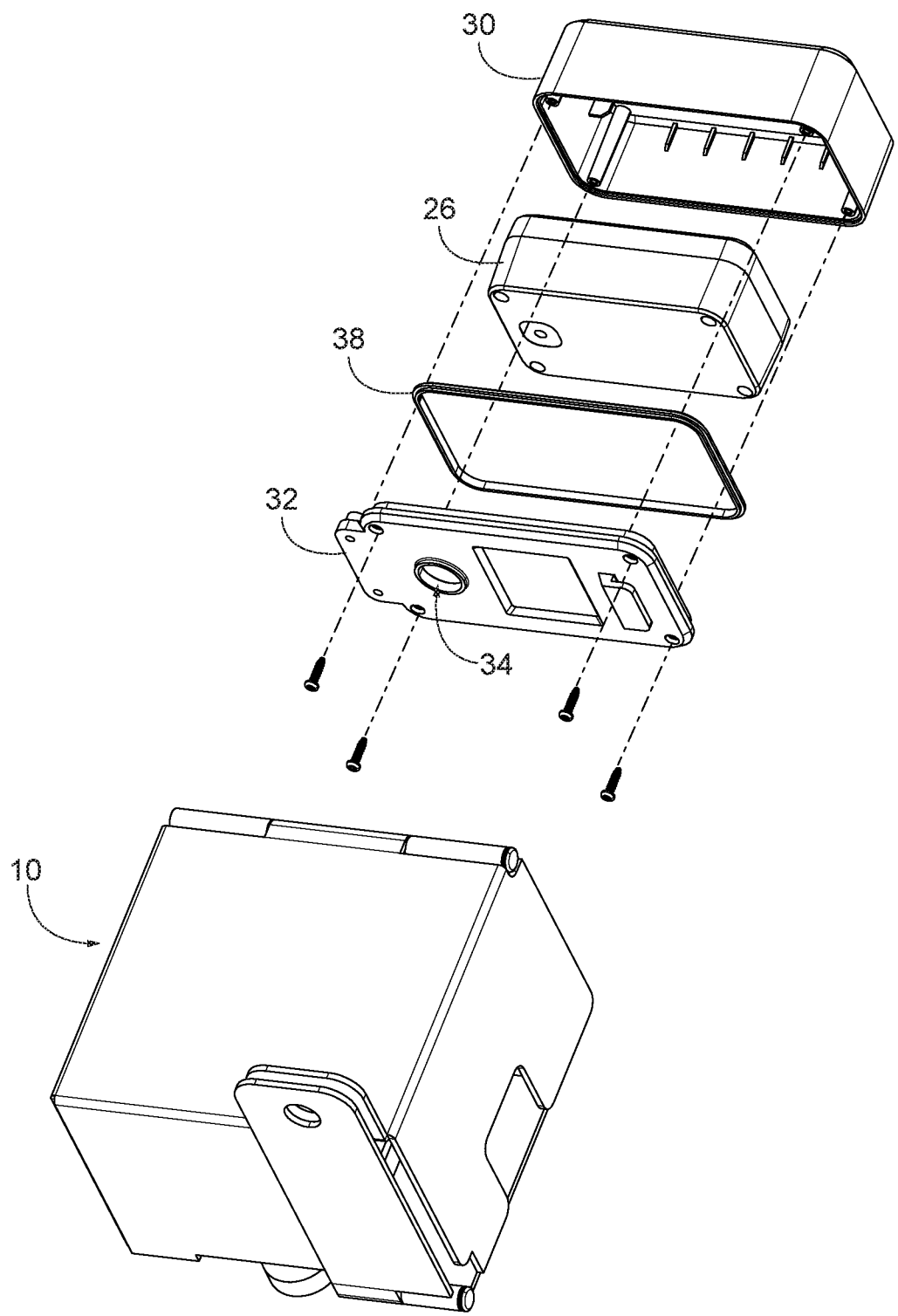
FIG. 3 is an exploded perspective view of a seal protector and an externally mounted GPS tracker unit.

FIG. 3 shows a second preferred embodiment of seal protector 10 of FIG. 1 in which the GPS tracker unit is mounted externally to the seal protector. In this embodiment, an opening is made in the rear surface of the seal protector cover. The GPS tracker unit is situated in a housing 30 which is then fixed to the surface of the seal protector by a mount 32 with the lens 34 of the GPS tracker unit aligned with an opening 36 in the mount and the opening in the rear of the seal protector. A rubber O-ring 38 may be used between the housing and the mount for a water-tight seal.

Figure 4:
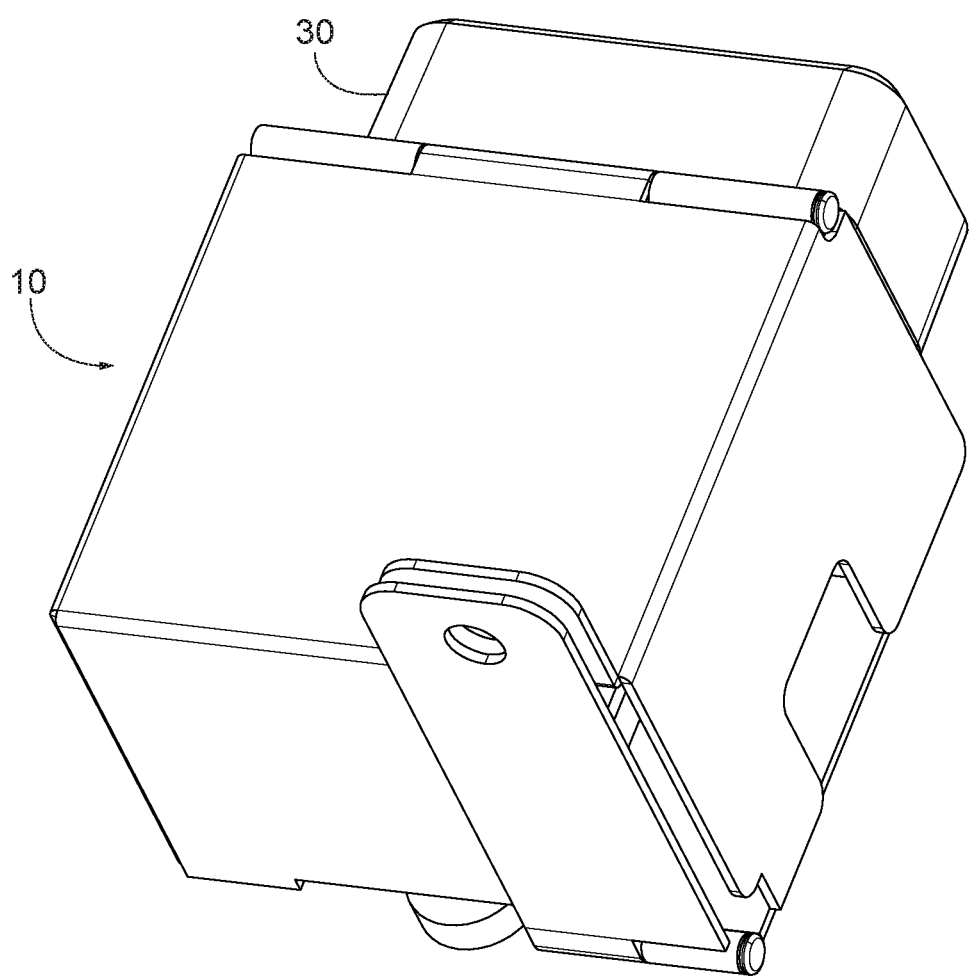
FIG. 4 is a perspective view of the seal protector and GPS Tracker unknit of FIG. 3.

FIG. 4 shows the seal protector of FIG. 3 with the externally mounted GPS tracker unit.

While only a limited number of preferred embodiments of the present invention have been disclosed for purposes of illustration, it is obvious that many modifications and variations could be made thereto. It is intended to cover all of those modifications and variations which fall within the scope of the present invention, as defined by the following claims.

I claim:

1. A security device for protecting cargo in the cargo compartment of a vehicle having a cargo compartment access door associated with a seal, the device comprising a protector for the seal in the form of an enclosure which surrounds the seal when closed and can be opened to access the seal, a light-actuated GPS tracking device capable of transmitting an alarm signal, said GPS tracking device being actuated by light entering said enclosure when said enclosure is opened to transmit said alarm signal to a remote server, said alarm signal indicating the time and location of the vehicle when the enclosure was opened.

2. The device of claim 1 wherein said cargo compartment door comprises a handle moveable between a first position, wherein the cargo compartment door can be opened to access the cargo compartment, and a second position, wherein the cargo door cannot be opened, wherein the seal is broken if the handle is moved from its second position, and wherein said enclosure surrounds a portion of said handle when said handle is in said second position and said enclosure is closed.

3. The device of claim 1 wherein said enclosure comprises a hollow metal box-like enclosure, said enclosure comprising first and second parts movable between an open position, wherein an interior of said box is exposed to light, and a closed position, wherein said seal cannot be accessed.

4. The device of claim 3 wherein at least one of said enclosure parts is configured to accommodate a portion of the handle when said parts are in the closed position.

5. The device of claim 1 further comprising means for locking said parts in said closed position.

6. The device of claim 5 wherein said locking means comprises a padlock.

7. The device of claim 2 wherein said enclosure comprises a base part and a cover part, wherein said base part may be situated adjacent the surface of the door, under a portion of the handle.

8. The device of claim 7 wherein the door has hardware for mounting the seal and said base part comprises a recess adapted to accommodate the seal mounting hardware of the door.

9. The device of claim 1 wherein said GPS tracking device is situated within said enclosure.

10. The device of claim 1 wherein said GPS tracking device is situated outside of said enclosure.

11. The device of claim 10 further comprising a housing for containing said GPS tracking device and for mounting said GPS tracking device to the exterior surface of said enclosure.

* * * * *